US 6,944,543 B2

(12) United States Patent
Prakah-Asante et al.

(10) Patent No.: US 6,944,543 B2
(45) Date of Patent: Sep. 13, 2005

(54) INTEGRATED COLLISION PREDICTION AND SAFETY SYSTEMS CONTROL FOR IMPROVED VEHICLE SAFETY

(75) Inventors: Kwaku O. Prakah-Asante, Commerce Township, MI (US); Manoharprasad K. Rao, Novi, MI (US); Gary Steven Strumolo, Beverly Hills, MI (US)

(73) Assignee: Ford Global Technologies LLC, Dearborn, MI (US)

(*) Notice: Subject to any disclaimer, the term of this patent is extended or adjusted under 35 U.S.C. 154(b) by 409 days.

(21) Appl. No.: 10/076,405

(22) Filed: Feb. 15, 2002

(65) Prior Publication Data

US 2003/0060980 A1 Mar. 27, 2003

Related U.S. Application Data (60) Provisional application No. 60/324,237, filed on Sep. 21, 2001.

(51) Int. Cl.[7] .................................................. G06F 7/00
(52) U.S. Cl. ........................ 701/301; 701/96; 342/70; 342/118; 180/167
(58) Field of Search ................................. 701/301, 300, 701/96, 102, 93, 70, 36, 1; 340/933, 903, 436, 435; 342/70, 71, 72, 107, 115, 455, 118, 128, 133, 147; 280/735; 180/271, 167, 170

(56) References Cited

U.S. PATENT DOCUMENTS

| 5,448,484 A | | 9/1995 | Bullock et al. | |
|---|---|---|---|---|
| 5,463,374 A | | 10/1995 | Mendez et al. | |
| 5,465,308 A | | 11/1995 | Hutcheson et al. | |
| 5,529,138 A | | 6/1996 | Shaw et al. | |
| 5,530,651 A | * | 6/1996 | Uemura et al. | 340/435 |
| 5,541,590 A | | 7/1996 | Nishio | |
| 5,559,695 A | | 9/1996 | Daily | |

(Continued)

FOREIGN PATENT DOCUMENTS

WO  WO 96/23290  8/1996

OTHER PUBLICATIONS

Lippman, Richard. "Pattern Classification Using Neural Networks"; IEEE Communication, vol. 27, No. 11, pp. 45–65, Nov. 1989.

Wan, Yue. "A New Edge Detector for Obstacle Detecton with a Linear Stereo Vision System", Proceedings of the Intelligent Vehicles 1995 Symposium, Sep. 25–26, 1995, Detroit, USA, sponsed by IEE Industrial Electronics Society, pp. 130–135, 1995.

Kruger, W. "Real–Time Estimation and Tracking of Optical Flow Vectors for Obstacle Detection", Proceedings of the Intelligent Vehicles 1995 Symposium, Sep. 25–26, 1995, Detroit, USA, sponsored by IEE Industrial Electronics Soeiety, pp. 304–309, 1995.

(Continued)

Primary Examiner—Thomas G. Black
Assistant Examiner—Tuan C To
(74) Attorney, Agent, or Firm—Frank A. MacKenzie; Artz & Artz, P.C.

(57) ABSTRACT

A control system for an automotive vehicle (50) has a radar or lidar system (22) used to generate a remote object signal. A vision system (26) confirms the presence of the target object in the detection zone. A controller (12) is coupled to the remote object sensor and a vehicle dynamics sensor and the brake system. The controller predicts a host vehicle trajectory in response to the host vehicle dynamic signal, determines an azimuth angle for the target object, determines an actuation value in response to the target range signal, the target relative velocity signal, the host vehicle trajectory, host vehicle brake system status and the target azimuth angle. The controller (12) activates a countermeasure in response to the actuation value.

20 Claims, 4 Drawing Sheets

U.S. PATENT DOCUMENTS

| | | | |
|---|---|---|---|
| 5,574,644 A | * 11/1996 | Butsuen et al. | 340/903 |
| 5,646,612 A | 7/1997 | Byon | |
| 5,661,651 A | 8/1997 | Geschke et al. | |
| 5,717,376 A | 2/1998 | Wilson | |
| 5,745,870 A | * 4/1998 | Yamamoto et al. | 701/301 |
| 5,761,326 A | 6/1998 | Brady et al. | |
| 5,761,629 A | * 6/1998 | Gilling | 701/96 |
| 5,808,561 A | * 9/1998 | Kinoshita et al. | 340/903 |
| 5,838,229 A | 11/1998 | Robinson, III | |
| 5,870,493 A | 2/1999 | Vogl et al. | |
| 5,963,128 A | 10/1999 | McClelland | |
| 5,983,161 A | 11/1999 | Lemelson et al. | |
| 5,995,652 A | 11/1999 | Chiu et al. | |
| 6,012,008 A | 1/2000 | Scully | |
| 6,058,347 A | * 5/2000 | Yamamura et al. | 701/96 |
| 6,078,252 A | 6/2000 | Kulczycki et al. | |
| 6,085,151 A | 7/2000 | Farmer et al. | |
| 6,092,059 A | 7/2000 | Straforini et al. | |
| 6,226,389 B1 | 5/2001 | Lemelson et al. | |
| 6,294,987 B1 | * 9/2001 | Matsuda et al. | 340/436 |
| 6,304,811 B1 | * 10/2001 | Prestl | 701/96 |
| 6,311,123 B1 | * 10/2001 | Nakamura et al. | 701/96 |
| 6,317,679 B2 | * 11/2001 | Sielagoski et al. | 701/96 |
| 6,348,889 B1 | * 2/2002 | Ashihara et al. | 342/70 |
| 6,353,788 B1 | * 3/2002 | Baker et al. | 701/96 |
| 6,405,132 B1 | * 6/2002 | Breed et al. | 701/301 |
| 6,420,997 B1 | * 7/2002 | Cong | 342/70 |
| 6,459,983 B1 | * 10/2002 | Lichtenberg et al. | 701/96 |
| 6,496,770 B2 | * 12/2002 | Winner et al. | 701/96 |
| 2002/0138193 A1 | * 9/2002 | Miyahara | 701/96 |

OTHER PUBLICATIONS

Lipton, A.J., etc., "Moving Target Classification and Tracking From Real–Time Video", Proceedings of Image Undersatnding Workshop, 1998.

Weiss, I., "Model–Based Recognition of 3D Object from One View", Proceedings of Image Understanding Workshop, 1998.

Kamat, V. etc., "An Efficient Implementation of the Hough Transform for Detecting Vehicle License Plates Using DSP's", Proceedings of IEEE Real–Time Technology and Applications, Los Angeles, 1995.

Kamat, V. & Ganesan, S. "An Algorithm for Vehicle Ientification Using Digital Signal Processors", Intl. Conf. On Signal Processing Applications and Technology, vol. 1, 1993, pp. 875–888.

Schneiderman, H., "A Statistical Approach to 3D Object Detection Applied to Faces and Cars", CMU–RI–TR–00–06, 2000.

Zhao, L. and Thorpe, C., Stereo–and Neural Network–Based Pedestrian Detection, Proc. ITSC'99, Tokyo, Japan, 1999.

* cited by examiner

INTEGRATED COLLISION PREDICTION AND SAFETY SYSTEMS CONTROL FOR IMPROVED VEHICLE SAFETY

This application claims the benefit of Provisional Application No. 60/324,237, filed Sep. 21, 2001.

TECHNICAL FIELD

The present invention relates to collision prediction for automotive vehicles, and more particularly, to an integrated collision prediction and safety systems control methodology for improved vehicle safety.

BACKGROUND

Auto manufacturers are investigating radar, lidar, and vision-based pre-crash sensing systems to improve occupant safety. Current vehicles typically employ accelerometers that measure decelerations acting on the vehicle body in the event of a crash. In response to accelerometers, airbags or other safety devices are activated.

In certain crash situations it would be desirable to provide information before forces actually act upon the vehicle when a collision is unavoidable.

Remote sensing systems using radar, lidar or vision based technologies for adaptive cruise control, collision avoidance and collision warning applications are known. These systems have characteristic requirements for false alarms. Generally, the remote sensing system reliability requirements for pre-crash sensing for automotive safety related systems are more stringent than those for comfort and convenience features, such as, adaptive cruise control. The reliability requirements even for safety related features vary significantly, depending upon the safety countermeasure under consideration. For example, tolerance towards undesirable activations may be higher for activating motorized belt pre-tensioners than for functions such as vehicle suspension height adjustments. Non-reversible safety countermeasures, including airbags, require extremely reliable sensing systems for pre-crash activation. Innovative algorithms are required to verify the information received from sensor systems and to predict the potential for impact within the limitations of the sensing system, while maintaining reliability and minimization of false alarms. It would be desirable to have coordinated decision-making on when to activate safety systems such as active front suspension systems and motorized belt pre-tensioners. In addition, strategies for reversing activation, minimization of predictive sensor error, while accounting for occupant characteristics, are desired.

It would therefore be desirable to provide a pre-crash sensing system that accurately determines the potential threat of an object, by capitalizing on the performance of multiple sensor systems. There is also a need in the art to provide coordinated decision-making for countermeasure activation based on an aggregate evaluation of sensor and countermeasure dynamics to accomplish these desires.

SUMMARY OF THE INVENTION

The present invention, accordingly, provides an integrated collision prediction and safety control system and methodology for appropriate deployment of safety systems to meet the requirements of vehicle safety and occupant protection.

In one aspect of the invention, a system for an automotive vehicle has a radar or lidar system used to generate a remote object signal. A vision system confirms the presence of the object in the detection zone. A controller is coupled to the object sensor and a vehicle dynamics sensor. The controller also monitors the brake system status. The controller predicts a host vehicle trajectory in response to the host vehicle dynamic signal, determines an azimuth angle for the target vehicle, and determines an actuation value in response to the target range signal, the target relative velocity signal, the host vehicle trajectory, the azimuth and the brake system status. The controller activates a countermeasure in response to the relative actuation value.

In a further aspect of the invention, a method of pre-crash sensing for host automotive vehicle coupled to a countermeasure system includes generating target range signal and target relative velocity signal, measuring host vehicle dynamic conditions, predicting a host vehicle trajectory in response to the host vehicle dynamic conditions, determining an azimuth angle for the target object, monitoring the status of the brake system, determining an actuation value in response to the target range signal, the target relative velocity signal, the host vehicle trajectory, the target azimuth, brake system status, and activating a countermeasure in response to the relative actuation value.

One advantage of the invention is that the relative azimuth position of the target object and orientation of the target object may be taken into consideration. Further, the occupant driving characteristic such as braking may also be included in the countermeasure activation decisions. With the driver-in-the-loop braking information, activation of particular safety devices can be made with a higher level of certainty. Yet another advantage of the present invention is that countermeasure activation is based on a control law that incorporates aggregate contribution of multiple sensor systems which significantly improves the reliability and robustness of tailored safety system deployment.

Another advantage of the invention is that unintentional or inadvertent activation of countermeasure devices is minimized.

Other advantages and features of the present invention will become apparent when viewed in light of the detailed description of the preferred embodiment when taken in conjunction with the attached drawings and appended claims.

DESCRIPTION OF THE PREFERRED EMBODIMENT

In the following figures the same reference numerals will be used to identify the same components. While the present invention is illustrated with respect to several types of remote object sensors, various types and combinations of remote object sensors may be used as will be further described below. Also, the host vehicle is the vehicle sensing the potential crash event, while the target vehicle or object is the vehicle or object forming a potential collision with the host vehicle.

Figure 1:
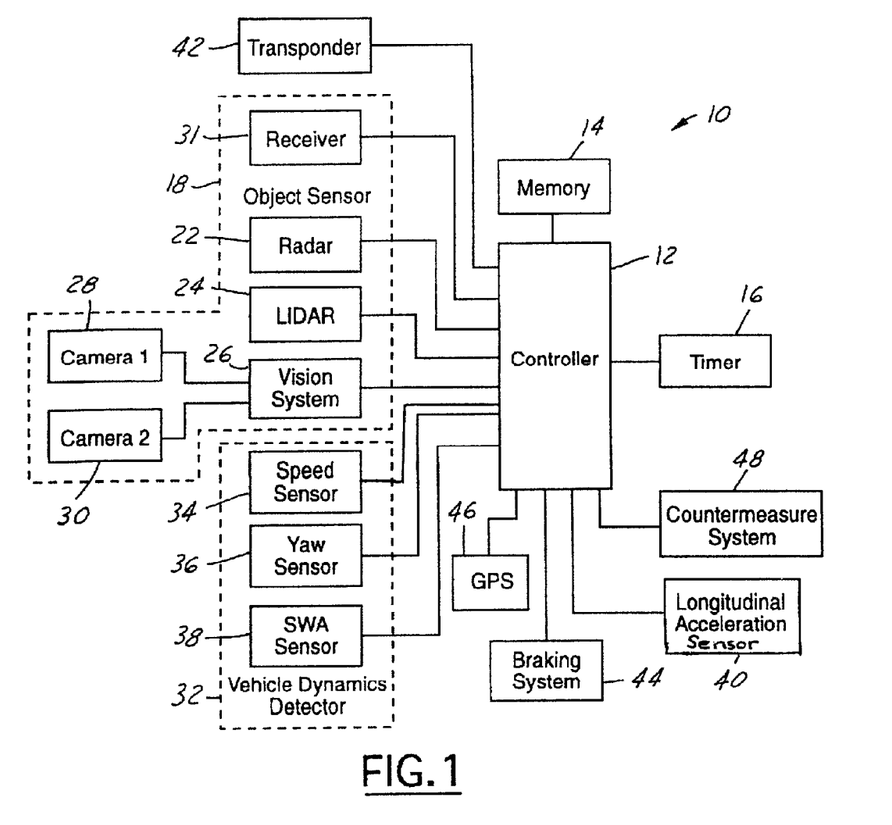
FIG. 1 is a block diagrammatic view of a pre-crash sensing system according to the present invention.

Referring now to FIG. 1, a pre-crash sensing system 10 has a controller 12. Controller 12 is preferably a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down. For example based on time, the acceleration of the vehicle can be determined from a velocity.

A remote object sensor 18 is coupled to controller 12. Remote object sensor 18 generates an object signal in the presence of an object within its field of view. Remote object sensor 18 may be comprised of one or a number of combinations of sensors including a radar 22, a lidar 24, and a vision system 26. Vision system 26 may be comprised of one or more cameras, CCD, or CMOS type devices. As illustrated, a first camera 28 and a second camera 30 may form vision system 26. Both radar 22 and lidar 24 are capable of sensing the presence and the distance of an object from the vehicle. The camera system is also capable of detecting the distance of an object from the vehicle. Alternatively, as will be further described below, radar 22 or lidar 24 may be used to detect an object within a detection zone and vision system 26 may be used to confirm the presence of the object within the detection zone. In another embodiment of the invention vision system consisting of cameras 1 and 2, alone may use established triangulation techniques to determine the presence of an object, the distance from the vehicle and relative velocity of the object as well as the object's size that may include area, height or width, or combinations thereof. Preferably, the cameras are high-speed cameras operating in excess of 50 Hz. A suitable example is a CMOS-based high dynamic range camera cable of operating under widely differing lighting and contrast conditions.

A receiver 31 may also be included within object sensor 22. Receiver 31 may, however, be a stand alone device. Receiver 31 is also coupled to controller 12. Receiver 31 is used to receive signals from other vehicles or vehicle transponders.

A vehicle dynamics detector 32 is also coupled to controller 12. The vehicle dynamics detector 32 generates a signal or signals indicative of the dynamic conditions of the vehicle. The vehicle dynamics detector 32 may comprise various numbers or combinations of sensors but preferably include a speed sensor 34, a yaw rate sensor 36, and a steering wheel angle sensor 38. In addition, longitudinal acceleration sensor 40 may also be included in the vehicle dynamics detector 32. The longitudinal acceleration sensor can provide controller 12 some indication as to the occupant driving characteristics such as braking or deceleration.

Speed sensor 34 may be one of a variety of speed sensors known to those skilled in the art. For example, a suitable speed sensor may include a sensor at every wheel that is averaged by controller 12. Preferably, controller translates the wheel speeds into the speed of the vehicle. Suitable type of speed sensors 34 may include, for example, toothed wheel sensors such as those employed on anti-lock brake systems.

Yaw rate sensor 36 preferably provides the yaw rate of the vehicle about the center of gravity of the vehicle. The yaw rate measures the rotational tendency of the vehicle about an axis normal to the surface of the road. Although yaw rate sensor is preferably located at the center of gravity, those skilled in the art will recognize that the yaw rate sensor may be located in various locations of the vehicle and translated back to the center of gravity either through calculations at the yaw rate sensor 36 or through calculations within controller 12 in a known manner.

Steering wheel angle sensor 38 provides a steering wheel angle signal to controller 12. The steering wheel angle signal corresponds to the steering wheel angle of the hand wheel of the automotive vehicle. As will be further set forth below, the yaw rate sensor 36 and the vehicle speed sensor 34 or the steering wheel angle sensor 38 alone, or the above sensors in combination, may be used to indicate the kinematics of the vehicle.

Longitudinal acceleration sensor 40 may be a separate sensor or may be derived. That is the change in speed over a predetermined time is defined as the acceleration. Thus, by measuring speed from speed sensor 34 and time from timer 16 an approximation of acceleration or deceleration may be obtained. In vehicles with systems such as yaw control or rollover control such a sensor may be already incorporated into the vehicle.

A global positioning system (GPS) 46 may also be coupled to controller 12. GPS 46 system generates a vehicle position of the host vehicle in response to satellites. Controller 12 may use this information in determining the relative position of the host vehicle and a target vehicle.

A transponder 42 may also be coupled to controller 12. Transponder 42 may generate information from controller 12 and transmit it to other vehicles upon the reception of a predetermined frequency signal from another vehicle. Also, transponder 42 may always be activated and broadcasting vehicle information to other vehicles. Transponder 42 and receiver 31 may be located in a common location and integrally formed therewith.

A braking system conditions sensor 44 may also be coupled to controller 12. Braking system conditions 44 may be a sensor or sensors such as a brake pedal position sensor or a brake pressure monitor. The brake system conditions may be used to determine occupant driving characteristics and therefore provide an improved collision prediction and as a result provide an improved countermeasure deployment decision as will be further described below.

Controller 12 is used to control the activation of a countermeasure system 48. Each countermeasure may have an individual actuator associated therewith. In that case, controller 12 may direct the individual countermeasure actuator to activate the countermeasure. Various types of countermeasure systems will be evident to those skilled in the art. Examples of a countermeasure within countermeasure system include occupant belt pretensioning, bumper height changing including nose dipping, braking, the pre-arming of internal airbags, the deployment of exterior or internal airbags, pedal control, steering column position, head restraint and knee bolster control. Preferably, controller 12 is programmed to activate the appropriate countermeasure in response to the inputs from the various sensors.

Figure 2:
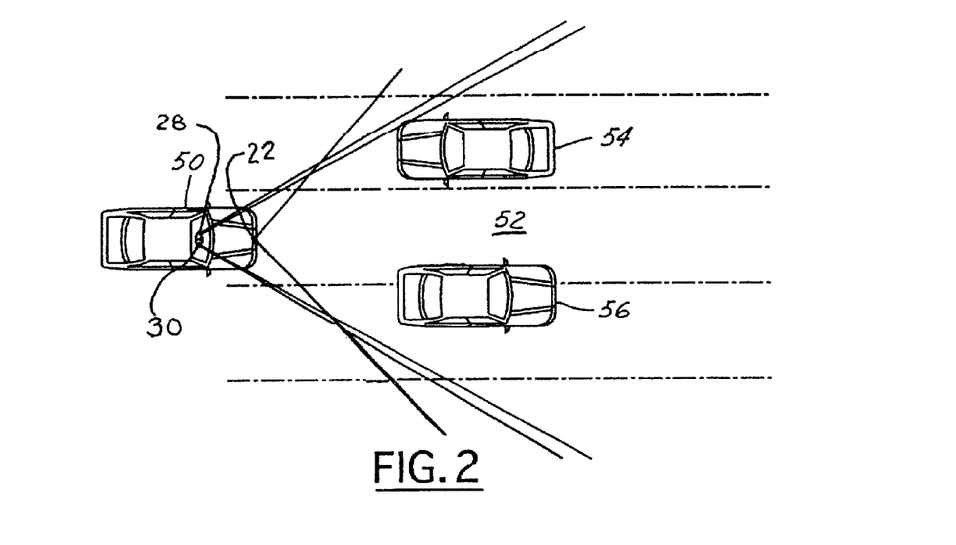
FIG. 2 is a top view of an automotive vehicle having a stereo pair of cameras mounted behind the rear view mirror and a radar sensor mounted in front of the vehicle.

Referring now to FIG. 2, a vision system with a stereo pair of cameras 28 and 30 and a radar system with a wide detection zone are depicted on the host vehicle 50 having pre-crash system 10. The radar system can detect the presence of an object in its detection zone 52, obtain its distance and relative velocity. The camera system alone can also be used to detect the presence of the object in its detection zone 52, obtain its distance, relative velocity and size information. Alternately, the radar system can be used to detect the presence of the object, its distance and relative velocity and the vision system can be used to confirm the above items and also to provide additional information about the size of the object. For pre-crash sensing applications, it is permissible to have both radar and vision based systems to ensure good performance under all weather conditions and also to provide redundancy for improved reliability. Host vehicle 50 is illustrated relative to target vehicles 54 and 56. Target vehicle 54 is traveling in an opposite direction to host vehicle 50. Target vehicle 56 is traveling in the opposite direction of vehicle 54.

Figure 3:
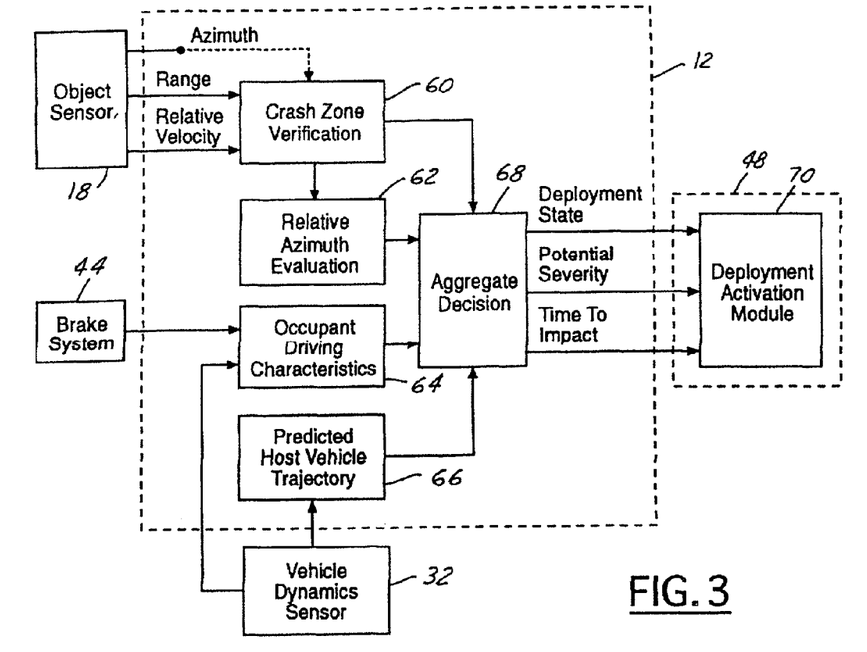
FIG. 3 is a block diagrammatic view of the controller of FIG. 1.

Referring now to FIG. 3, controller 12 is illustrated in further detail in relation to countermeasure system 48. Controller 12 may be one component or a collection of individual control elements. The present diagram depicts several features of controller 12 that are preferably implemented in software. However, those skilled in the art will also recognize that such systems may be implemented in hardware. Controller 12 has a crash zone verification block 60 that is used to monitor the distance and velocity in front of the vehicle corresponding to the detection zone 52. Various object parameters including distance or range, and the relative velocities of the object may be monitored by object sensor 18. In addition, object sensor 18 may provide azimuth information to crash zone verification block 60. Preferably, crash zone verification block 60 uses the radar for range and velocity information because of its relatively high accuracy.

A relative azimuth evaluation block 62 is coupled to crash zone verification block 60. Relative azimuth evaluation block 62 evaluates the change in azimuth of the target vehicle relative to the host vehicle and computes a divergence or convergence of the change in azimuth. Small azimuth angle values or rapid reductions in the azimuth angle are a strong indicator of the obstacle or target vehicle being in the path or approaching the path of the host vehicle. The change in azimuth angle is used in the pre-crash decision as will be further described below.

Occupant driving characteristics block 64 monitors the occupant driving characteristics for consideration in the countermeasure activation system. The occupant driving characteristics is an indication as to how the vehicle is being driven by the occupant. The occupant driving characteristics may, for example, receive information from brake system 44 or other vehicle dynamic sensors such as the longitudinal acceleration sensor 40 shown in FIG. 1. The occupant driving characteristics may include the brake pedal position which may be translated into brake pressure. The occupant driving characteristics may also include a direct measurement of brake pressure alone. Another occupant driving characteristic may include measuring a longitudinal acceleration of the vehicle. By monitoring the longitudinal acceleration, the braking characteristic of the vehicle may also be determined. By providing occupant driving characteristics decisions may be made regarding the type of deployment suitable for the situation. In a sense, the driver's feedback using occupant driving characteristics block 64 provides the control system with an indication as to the vehicle conditions and intentions of its driver.

Controller 12 may also have a predicted host vehicle trajectory block 66 that calculates a predicted trajectory of the host vehicle. The predicted host vehicle trajectory may be predicted using the outputs from various sensors including the vehicle dynamic sensor 32.

Blocks 60, 62, 64, and 66 may all be used together in an aggregate decision block 68 to form various information such as deployment state, potential severity, and time to impact for countermeasure system 48 and a deployment activation module 70 therein.

The equations governing the activation control laws in aggregate decision block 68 are given by, $$Cpt\_R_{stat} = \begin{cases} 1 & \text{if } R \le R\_thres \\ 0 & \text{if } R > R\_thres \end{cases} \quad (1)$$

$$Cpt\_V_{stat} = \begin{cases} 1 & \text{if } V \ge V\_thres \\ 0 & \text{if } V < V\_thres \end{cases} \quad (2)$$

$$\hat{\dot{m}} = M\hat{x} + Iu + K(y - C\hat{x})$$
$$\hat{x} = [h_x, h_y, \psi, \Gamma, v]^T \quad (3)$$

$$Azm\_stat = \begin{cases} 1 & \text{if } G_1(\theta_1 - \theta_2) \ge Azm\_thres \\ 0 & \text{if } G_1(\theta_1 - \theta_2) < Azm\_thres \end{cases} \quad (4)$$

$$Brake\_stat = \begin{cases} 1 & \text{if } G_2(x_{pres} - \beta) \ge Brake\_thres \\ 0 & \text{if } G_2(x_{pres} - \beta) < Brake\_thres \end{cases} \quad (5)$$

$$Cpt\_rel\_act = \quad (6)$$
$$K_1\left(\frac{R}{R\_thres}\right) + K_2\left(\frac{V}{V\_thres}\right) + K_3(\theta_1 - \theta_2) + K_4(x_{pres} - \beta).$$

where:

Cpt_Rstat: is the respective Safety device Range status
Cpt_Vstat: is the respective Safety device Velocity status
Azm_stat: is the relative azimuth status
Brake_stat: is the braking level indicator status
Cpt_rel_act: is the relative actuation value
$G_1$, $G_2$: are gain factors
$X_{pres}$: brake pressure
β: is the driver occupant medium braking threshold
K: is the estimator gains for position prediction
$\hat{x}$: host vehicle state vector
y: sensor measurements
M: host vehicle Dynamic Matrix
I: host vehicle Input Matrix
u: host vehicle inputs
C: Output Matrix
($h_x$, $h_y$): predicted host vehicle position
v: lateral velocity
ψ: predicted heading angle
Γ: yaw rate
$K_1$, $K_2$, $K_3$, $K_4$: are tunable gains
R_Thres: range threshold
V_thres: velocity threshold
Azm_thres: azimuth threshold
Brake_thres: brake threshold The operative decision in aggregate block 68 is depicted by Equation 6 which takes into consideration each of the various factors including the crash zone verification, the azimuth information, the occupant driving characteristics and the host vehicle trajectory. The weighting factors or gains $K_1$, $K_2$, $K_3$, and $K_4$ may vary depending on the particular vehicle conditions.

Figure 4:
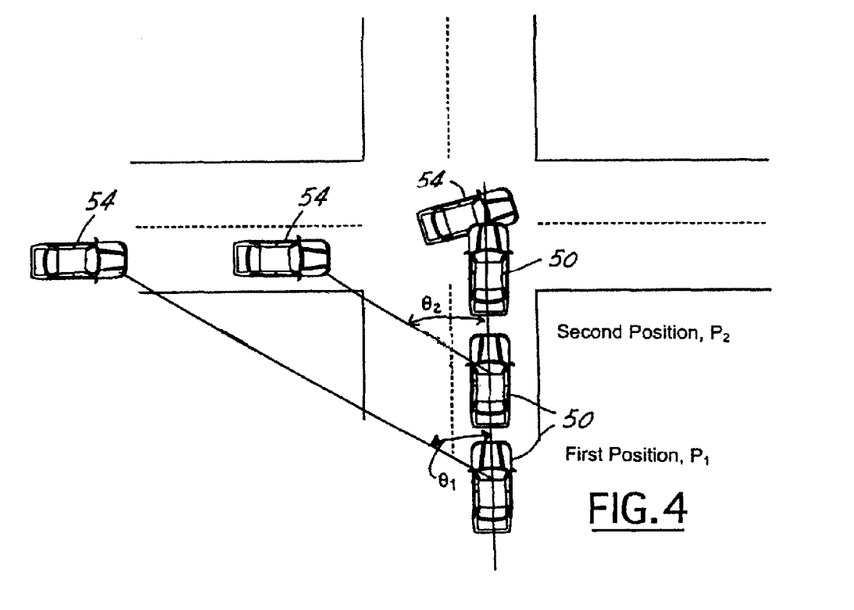
FIG. 4 is a top view of a target vehicle and host vehicle in various positions illustrating a change in azimuth.

Referring now to FIG. 4, a host vehicle 50 is shown relative to a target vehicle 54 in various positions. As can be seen, a first angle $\theta_1$ corresponding to a first position $P_1$ is greater than a second angle $\theta_2$ corresponding to a second position $P_2$ thus illustrating a convergence of the azimuth of the first vehicle and the second vehicle.

Figure 5:
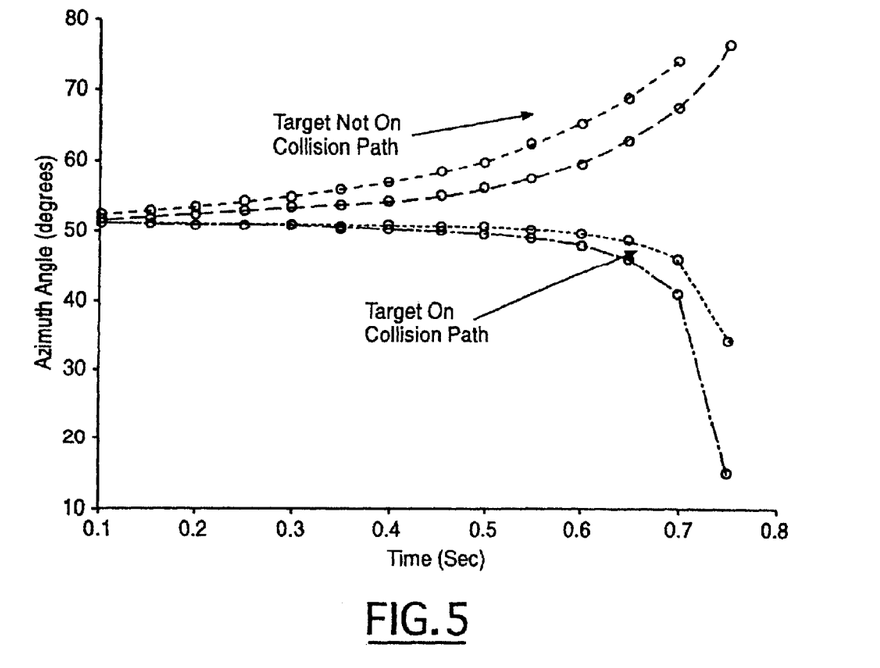
FIG. 5 is a plot of azimuth versus time for various vehicle paths.

Referring now to FIG. 5, a plot of azimuth angle versus time is illustrated for vehicles not on a collision path at the top two lines of the plot and for targets on a collision path at the bottom two lines of the path. As can be seen, for a target on a collision path the azimuth angle greatly decreases over a short period of time as compared to a target not on a collision path which has the azimuth angle increasing over time.

Figure 6:
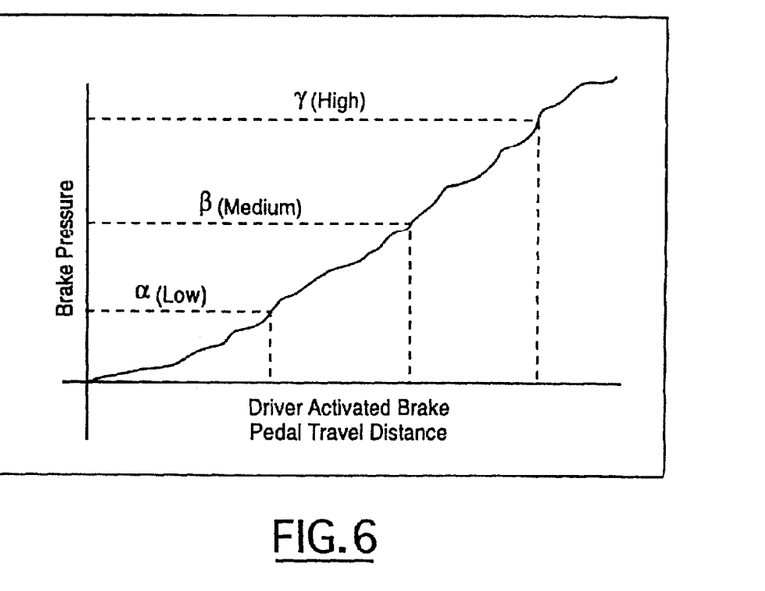
FIG. 6 is a plot of brake pressure versus pedal travel distance showing an occupant driving characteristic.

Referring now to FIG. 6, a plot of occupant driving characteristics is illustrated. In this plot, the driver activated brake pedal travel distance is plotted relative to brake pressure. High, medium and low bands are illustrated by $\alpha$, $\beta$, and $\gamma$. In the formulas shown above, the brake pressure difference from $\beta$ is determined to provide an input to the crash deployment characteristic.

Figure 7:
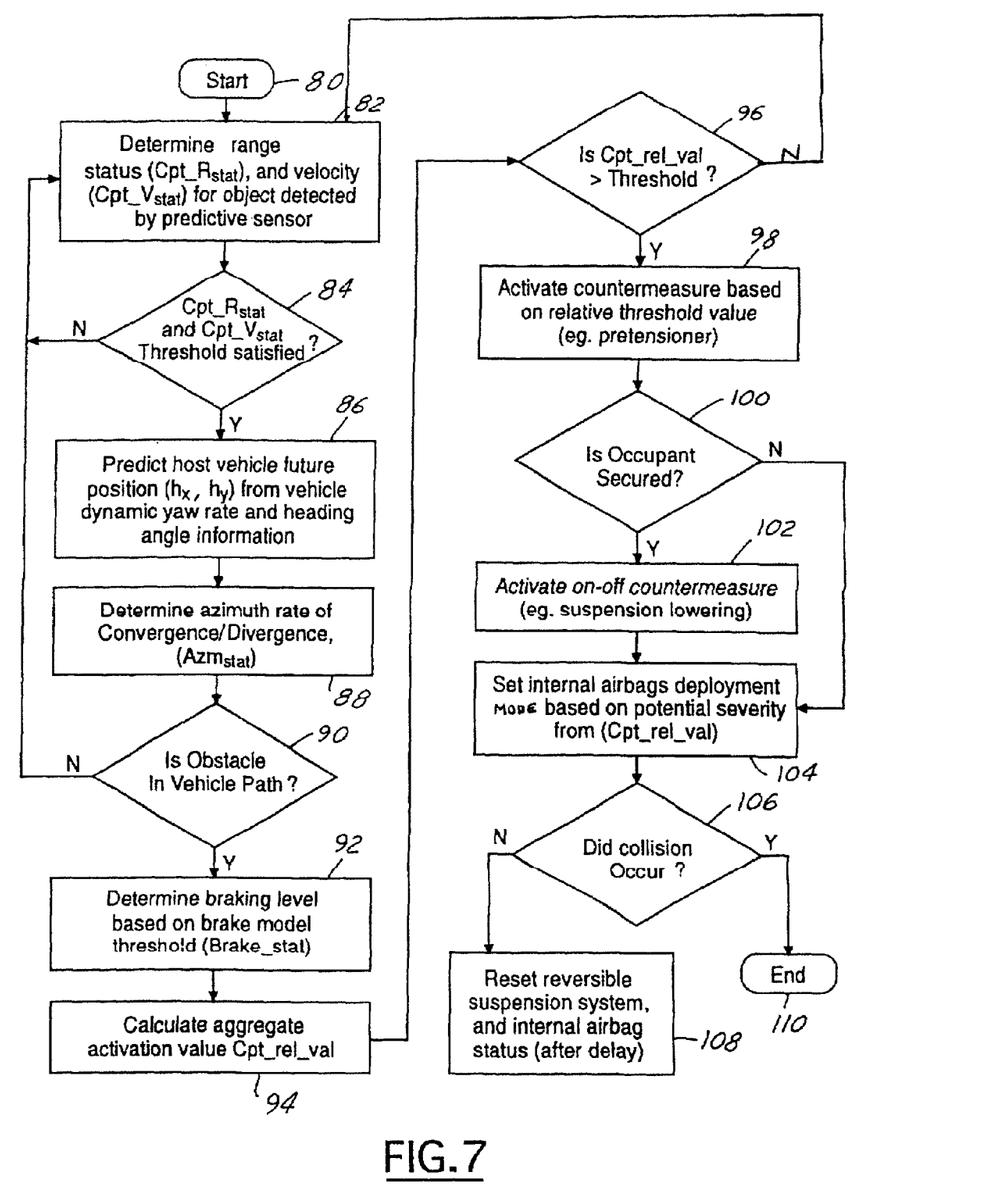
FIG. 7 is a flow chart of a method for operating the pre-crash sensing system according to the present invention.

Referring now to FIG. 7, the process of a pre-crash decision is started in step 80. In step 82, the safety device range status ($C_{pt\_}R_{stat}$) and the velocity status ($C_{pt\_}V_{stat}$) for an object is detected by the object sensor. In step 84, if the safety device range status and the safety device velocity status thresholds are not satisfied, step 82 is again repeated. If in step 84 the thresholds have been satisfied, the vehicle future position ($h_x$, $h_y$) from the yaw rate and heading angle are determined. Based upon this information the azimuth rate of convergence or divergence ($Azm_{stat}$) is determined in step 88. In step 90, it is determined whether an obstacle is in the vehicle path. If an obstacle is not in the vehicle path based on the azimuth heading information then step 82 is again executed. In step 90 if a vehicle is in the path then a braking level based on a brake model threshold is determined. In step 94, the aggregate activation value ($C_{pt\_rel\_val}$) is determined from Equation 6 illustrated above wherein the azimuth range, velocity, and occupant driving characteristics may be considered. When factored together, if the value is not above a predetermined threshold then step 82 is again executed. When the value is above the threshold, step 98 is executed in which a countermeasure, for example a motorized pre-tensioner, is activated based on the relative threshold value. It should be noted that various types of countermeasures may be deployed and therefore different types of countermeasures may be performed based upon this value. That is, a choice between various countermeasures may be determined based upon the aggregate activation value. In step 100, if the occupant is secured, step 102 is executed. In step 102, on-off countermeasures may also be activated. One example of a suitable activation would be to lower the suspension height. In step 104, the internal airbag deployment mode based upon the severity of the aggregate activation value may be set. Referring back to step 100, if the occupant is not secured step 104 may be activated. Thus, a choice may be determined based upon the occupant being secured or unsecured. In step 106, if a collision did not occur, the reversible suspension system and internal airbag status may be reset in step 108. If a collision did occur in step 106, the system ends in step 110.

As can be seen, various factors are combined together to determine the aggregate activation value. This aggregate activation value thus can determine which countermeasures to deploy. Also, various countermeasures may be disabled or different modes of activation may be set in response to the seat belt status of the occupants of the vehicle. As can be seen, a more complete countermeasure activation determination than those known in the prior art that includes the azimuth, the host vehicle trajectory, and the target range and relative velocity values is determined.

While particular embodiments of the invention have been shown and described, numerous variations and alternate embodiments will occur to those skilled in the art. Accordingly, it is intended that the invention be limited only in terms of the appended claims.

What is claimed is:

1. An integrated collision prediction and safety systems control method for a host automotive vehicle comprising:

generating a target object range signal and a target relative velocity signal using pre-crash object sensors;

measuring host vehicle dynamic conditions;

predicting a host vehicle trajectory in response to the host vehicle dynamic conditions;

determining an azimuth for the target object;

monitoring the brake system status;

determining an actuation value as a function of the target range signal, the target relative velocity signal, the host vehicle trajectory, brake system status and the target azimuth; and activating a countermeasure in response to said actuation value.

2. A method as recited in claim 1 further comprising measuring an occupant driving characteristic.

3. A method as recited in claim 2 wherein the occupant driving characteristic comprises a braking characteristic.

4. A method as recited in claim 3 wherein the braking characteristic comprises brake pedal position.

5. A method as recited in claim 3 wherein the braking characteristic comprises brake pressure.

6. A method as recited in claim 2 wherein the occupant driving characteristic comprises longitudinal acceleration.

7. A method as recited in claim 1 wherein generating an actuation value (Cpt_rel_act) is achieved according to the following equation:

$$Cpt\_rel\_act = K_1\left(\frac{R}{R\_thres}\right) + K_2\left(\frac{V}{V\_thres}\right) + K_3(\theta_1 - \theta_2) + K_4(x_{pres} - \beta)$$

wherein $K_1$, $K_2$, $K_3$ and $K_4$ are tunable gains, R and R_thres are the range and range threshold respectively, V and V_thres are the relative velocity and relative velocity threshold respectively, $\theta_1$, and $\theta_2$ are the azimuth angles, $x_{pres}$ is the brake pressure, and $\beta$ is the occupant medium braking threshold.

8. A method as recited in claim 7 wherein generating the actuation value is a function of weighting factors which are adaptively tuned according to the vehicle driving conditions, and occupant characteristics and driving behavior.

9. A method as recited in claim 8 wherein said vision system comprises a stereo pair of cameras.

10. A method set forth in claim 7 wherein said actuation value determines the activation of safety systems to achieve reliable and robust tailored deployment.

11. A method as set forth in claim 7 wherein the actuation value is derived from multiple sensor systems depending on the confidence levels of detection and availability.

12. A method as recited in claim 1 wherein said object sensor comprises a vision system.

13. A method as recited in claim 1 wherein said object sensor comprises a radar or a lidar.

14. A method as recited in claim 1 wherein said object sensor comprises a vision system, and a lidar system.

15. A method as recited in claim 1 wherein said object sensor comprises a vision system, and a radar system.

16. A method as recited in claim 1 further comprising a vehicle dynamic detector measuring the host vehicle dynamic condition.

17. A method as recited in claim 16 wherein said vehicle dynamic detector comprises a vehicle speed sensor generating a speed signal corresponding to the longitudinal speed of the vehicle.

18. A method as recited in claim 16 wherein said vehicle dynamic detector comprises a yaw rate sensor.

19. A method as recited in claim 16 wherein said vehicle dynamic detector comprises a steering wheel angle sensor.

20. A pre-crash sensing system for an automotive vehicle having a brake system coupled to a countermeasure system, said pre-crash sensing system comprising:

a remote object sensor generating a target range signal and target relative velocity signal;

a vehicle dynamics sensor generating a vehicle dynamics signal; and a controller coupled to said object sensor, vehicle dynamics sensor, and brake system, said controller predicting a host vehicle trajectory in response to the host vehicle dynamic signal, determining an azimuth angle for the target object, monitoring the brake system status, determining an actuation value in response to the target range signal, the target relative velocity signal, the host vehicle trajectory, the target azimuth angle, and brake system status and activating selected countermeasures from the countermeasure system in response to the actuation value.

* * * * *